United States Patent
Zhao et al.

(10) Patent No.: US 9,634,888 B2
(45) Date of Patent: Apr. 25, 2017

(54) METHOD AND SYSTEM FOR TRANSMITTING DATA IN PARALLEL VIA WIRELESS LINK AND WIRED LINK

(71) Applicant: Huizhou TCL Mobile Communication Co., Ltd., HuiZhou (CN)

(72) Inventors: Shiqing Zhao, HuiZhou (CN); Baozhong Zhou, HuiZhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 14/421,828

(22) PCT Filed: Apr. 21, 2014

(86) PCT No.: PCT/CN2014/075815
§ 371 (c)(1),
(2) Date: Feb. 15, 2015

(87) PCT Pub. No.: WO2015/062219
PCT Pub. Date: May 7, 2015

(65) Prior Publication Data
US 2015/0180699 A1   Jun. 25, 2015

(30) Foreign Application Priority Data
Nov. 4, 2013  (CN) .......................... 2013 1 0536600

(51) Int. Cl.
*H04W 40/34*  (2009.01)
*H04W 24/08*  (2009.01)
(Continued)

(52) U.S. Cl.
CPC ............ *H04L 41/0668* (2013.01); *H04L 1/00* (2013.01); *H04L 41/0659* (2013.01);
(Continued)

(58) Field of Classification Search
None
See application file for complete search history.

(56) References Cited

U.S. PATENT DOCUMENTS

| | | | |
|---|---|---|---|
| 2005/0163093 A1* | 7/2005 | Garg | H04W 76/025 370/342 |
| 2008/0043716 A1* | 2/2008 | Toombs | H04L 45/00 370/351 |
| 2014/0086256 A1* | 3/2014 | Raniere | H04L 5/0001 370/401 |

FOREIGN PATENT DOCUMENTS

| | | |
|---|---|---|
| CN | 101018266 | 8/2007 |
| CN | 101106445 | 1/2008 |

(Continued)

*Primary Examiner* — Awet Haile
(74) *Attorney, Agent, or Firm* — JMB Davis Ben-David

(57) ABSTRACT

A method of the present invention includes: establishing one or more wireless links and one or more wired links for transmission data between a signal source end and a receiving end; allocating the transmission data to the wireless links and the wired links at the signal source end according to transmission rates of the wireless links and the wired links to transmit the transmission data in parallel via the wireless links and the wired links; and receiving data transmitted via the wireless links and the wired links at the receiving end, and restoring the received data into the transmission data. In the present invention, the data transmission abilities of the links are applied to the greatest extent.

14 Claims, 5 Drawing Sheets

(51) Int. Cl.
*H04L 12/64* (2006.01)
*H04L 12/703* (2013.01)
*H04W 76/02* (2009.01)
*H04L 12/24* (2006.01)
*H04L 1/00* (2006.01)
*H04W 76/00* (2009.01)
*H04L 12/26* (2006.01)
*H04L 12/70* (2013.01)
*H04W 28/22* (2009.01)
*H04W 72/02* (2009.01)

(52) U.S. Cl.
CPC .......... *H04L 43/0847* (2013.01); *H04L 47/00* (2013.01); *H04W 76/00* (2013.01); *H04W 28/22* (2013.01); *H04W 72/02* (2013.01)

(56) References Cited

FOREIGN PATENT DOCUMENTS

| | | |
|---|---|---|
| CN | 101309442 | 11/2008 |
| CN | 101854202 | 10/2010 |
| CN | 102905319 | 1/2013 |
| CN | 103200606 | 7/2013 |
| CN | 103580966 | 2/2014 |
| KR | 20080066207 | 7/2008 |

* cited by examiner

METHOD AND SYSTEM FOR TRANSMITTING DATA IN PARALLEL VIA WIRELESS LINK AND WIRED LINK

CROSS REFERENCE TO RELATED APPLICATION

This application claims the priority of Chinese Patent Application No. 201310536600.5, filed on Nov. 4, 2013 in the SIPO (State Intellectual Property Office of the P.R.C). Further, this application is the National Phase application of International Application No. PCT/CN2014/075815 filed Apr. 21, 2014, which designates the United States and was published in Chinese. The entire disclosure of each of the above applications is incorporated herein by reference.

BACKGROUND OF THE INVENTION

1. Field of the Invention

The present invention generally relates to a field of high-speed data transmission, and more particularly to a method and a system for transmitting data in parallel via one or more wireless links and one or more wired links.

2. Description of Prior Art

Currently, modern communication techniques change rapidly with the development of science and technology. Data capacity keeps increasing, and a transmission rate of data is faster and faster. A transmission rate of wireless communication is successively raised. Wireless communication has entered the 4G era now after the 2G and the 3G eras. The download speed of the 4G long term evolution (LTE) reaches 150 megabits per second (Mbps). Although the transmission rate of a wireless link keeps increasing, a user cannot utilize various types of wireless links and wired links to transmit data at the same time as the data is being transmitted. Accordingly, the links with the transmission abilities are not sufficiently utilized, and the transmission rate of the data is not high.

SUMMARY OF THE INVENTION

Based on the deficiencies in the prior art, an object of the present invention is to provide a method and a system for transmitting data in parallel via one or more wireless links and one or more wired links aiming to solve the problems that the transmission rate of data is low, and the data transmission links cannot be sufficiently utilized in the prior art.

A technical scheme of the present invention is as follows.

The present invention provides a method for transmitting data in parallel via one or more wireless links and one or more wired links, comprising:

Establishing the wireless links and the wired links for transmission data between a signal source end and a receiving end;

Acquiring transmission rates of the wireless links and transmission rates of the wired links;

Acquiring a data type of the transmission data;

Allocating the transmission data to the wireless links and the wired links according to the data type of the transmission data, the transmission rates of the wireless links, and the transmission rates of the wired links to transmit the transmission data in parallel via the wireless links and the wired links; and Receiving data transmitted via the wireless links and the wired links at the receiving end, and restoring the received data into the transmission data.

When a fault occurs in one of the wireless links and the wired links, the transmission data corresponding to the one of the wireless links and the wired links is re-allocated to another one of the wireless links and the wired links with a highest transmission rate.

In the method for transmitting the data in parallel via the one or more wireless links and the one or more wired links of the present invention, the step of allocating the transmission data to the wireless links and the wired links to transmit the transmission data in parallel via the wireless links and the wired links comprises:

Acquiring a data size of each task of the transmission data when the transmission data is a multi-task data; and Allocating one of the tasks with a large data size to one of the wireless links and the wired links with a high transmission rate, and allocating one of the tasks with a low data size to one of the wireless links and the wired links with a low transmission rate.

In the method for transmitting the data in parallel via the one or more wireless links and the one or more wired links of the present invention, the step of allocating the transmission data to the wireless links and the wired links to transmit the transmission data in parallel via the wireless links and the wired links comprises:

Splitting the transmission data into a plurality of transmission data blocks according to a number of the wireless link or links, a number of the wired link or links, the transmission rates of the wireless link or links, and the transmission rates of the wired link or links when the transmission data is a single-task data; and allocating the transmission data blocks to the wireless link or links and the wired link or links, wherein a number of the transmission data blocks is equal to a sum of the number of the wireless link or links and the number of the wired link or links, and sizes of the transmission data blocks correspond to the transmission rates of the wireless link or links and the wired link or links.

In the method for transmitting the data in parallel via the one or more wireless links and the one or more wired links of the present invention, the step of acquiring the transmission rates of the wireless links and the transmission rates of the wired links comprises:

Transmitting identical detecting signals to the receiving end via the wireless links and the wired links from the signal source end;

Transmitting the detecting signals to the signal source end after the receiving end receives the detecting signals;

Calculating required durations for the detecting signals to be transmitted and received via the wireless links and the wired links; and Calculating the transmission rates of the wireless links and the wired links according to the required durations and a size of the detecting signals.

In the method for transmitting the data in parallel via the one or more wireless links and the one or more wired links of the present invention, the wireless link or links comprise one or more of a wireless link of fourth generation (4G) mobile communication technology, a wireless link of third generation (3G) mobile communication technology, a wireless link of wireless fidelity (Wi-Fi), and a Bluetooth wireless link.

The present invention provides a method for transmitting data in parallel via one or more wireless links and one or more wired links, comprising:

Establishing the wireless links and the wired links for transmission data between a signal source end and a receiving end;

Allocating the transmission data to the wireless links and the wired links at the signal source end according to transmission rates of the wireless links and transmission rates of the wired links to transmit the transmission data in parallel via the wireless links and the wired links, wherein data which is allocated to each of the wireless links and the wired links is encrypted at the signal source end; and Receiving data transmitted via the wireless links and the wired links at the receiving end, and restoring the received data into the transmission data.

In the method for transmitting the data in parallel via the one or more wireless links and the one or more wired links of the present invention, the step of allocating the transmission data to the wireless links and the wired links at the signal source end according to the transmission rates of the wireless links and the transmission rates of the wired links to transmit the transmission data in parallel via the wireless links and the wired links comprises:

Acquiring the transmission rates of the wireless links and the transmission rates of the wired links;

Acquiring a data type of the transmission data; and

Allocating the transmission data to the wireless links and the wired links according to the type of the transmission data, the transmission rates of the wireless links, and the transmission rates of the wired links to transmit the transmission data in parallel via the wireless links and the wired links.

In the method for transmitting the data in parallel via the one or more wireless links and the one or more wired links of the present invention, the step of allocating the transmission data to the wireless links and the wired links to transmit the transmission data in parallel via the wireless links and the wired links comprises:

Acquiring a data size of each task of the transmission data when the transmission data is a multi-task data; and Allocating one of the tasks with a large data size to one of the wireless links and the wired links with a high transmission rate, and allocating one of the tasks with a low data size to one of the wireless links and the wired links with a low transmission rate.

In the method for transmitting the data in parallel via the one or more wireless links and the one or more wired links of the present invention, the step of allocating the transmission data to the wireless links and the wired links to transmit the transmission data in parallel via the wireless links and the wired links comprises:

Splitting the transmission data into a plurality of transmission data blocks according to a number of the wireless link or links, a number of the wired link or links, the transmission rates of the wireless link or links, and the transmission rates of the wired link or links when the transmission data is a single-task data; and allocating the transmission data blocks to the wireless links and the wired links, wherein a number of the transmission data blocks is equal to a sum of the number of the wireless link or links and the number of the wired link or links, and sizes of the transmission data blocks correspond to the transmission rates of the wireless link or links and the wired link or links.

In the method for transmitting the data in parallel via the one or more wireless links and the one or more wired links of the present invention, the step of acquiring the transmission rates of the wireless links and the transmission rates of the wired links comprises:

Transmitting identical detecting signals to the receiving end via the wireless links and the wired links from the signal source end;

Transmitting the detecting signals to the signal source end after the receiving end receives the detecting signals;

Calculating required durations for the detecting signals to be transmitted and received via the wireless links and the wired links; and Calculating the transmission rates of the wireless links and the wired links according to the required durations and a size of the detecting signals.

In the method for transmitting the data in parallel via the one or more wireless links and the one or more wired links of the present invention, the step of allocating the transmission data to the wireless links and the wired links at the signal source end according to the transmission rates of the wireless links and the transmission rates of the wired links to transmit the transmission data in parallel via the wireless links and the wired links comprises:

Re-allocating the transmission data corresponding to one of the wireless links and the wired links to another one of the wireless links and the wired links with a highest transmission rate when a fault occurs in the one of the wireless links and the wired links.

In the method for transmitting the data in parallel via the one or more wireless links and the one or more wired links of the present invention, the wireless link or links comprise one or more of a wireless link of fourth generation (4G) mobile communication technology, a wireless link of third generation (3G) mobile communication technology, a wireless link of wireless fidelity (Wi-Fi), and a Bluetooth wireless link.

The present invention further provides a system for transmitting data in parallel via one or more wireless links and one or more wired links, comprising:

A link establishing module for establishing the wireless links and the wired links for transmission data between a signal source end and a receiving end;

A data allocating module for allocating the transmission data to the wireless links and the wired links at the signal source end according to transmission rates of the wireless links and transmission rates of the wired links to transmit the transmission data in parallel via the wireless links and the wired links; and A data restoring module for restoring received data into the transmission data after the receiving end receives the received data from the wireless links and the wired links.

In the system for transmitting the data in parallel via the one or more wireless links and the one or more wired links of the present invention, the data allocating module comprises:

A transmission rate acquiring unit for acquiring the transmission rates of the wireless links and the transmission rates of the wired links;

A data type acquiring unit for acquiring a data type of the transmission data; and A data allocating unit for allocating the transmission data to the wireless links and the wired links according to the type of the transmission data, the transmission rates of the wireless links, and the transmission rates of the wired links to transmit the transmission data in parallel via the wireless links and the wired links.

In the system for transmitting the data in parallel via the one or more wireless links and the one or more wired links of the present invention, when the transmission data is a multi-task data, the data allocating unit acquires a data size of each task of the transmission data, allocates one of the tasks with a large data size to one of the wireless links and the wired links with a high transmission rate, and allocates one of the tasks with a low data size to one of the wireless links and the wired links with a low transmission rate.

In the system for transmitting the data in parallel via the one or more wireless links and the one or more wired links of the present invention, when the transmission data is a single-task data, the data allocating unit splits the transmission data into a plurality of transmission data blocks data according to a number of the wireless link or links, a number of the wired link or links, the transmission rates of the wireless link or links, the transmission rates of the wired link or links, and the transmission data blocks are allocated to the wireless link or links and the wired link or links, a number of the transmission data blocks is equal to a sum of the number of the wireless link or links and the number of the wired link or links, and sizes of the transmission data blocks correspond to the transmission rates of the wireless link or links and the wired link or links.

In the system for transmitting the data in parallel via the one or more wireless links and the one or more wired links of the present invention, the transmission rate acquiring unit acquires the transmission rates of the wireless links and the transmission rates of the wired links by:

Transmitting identical detecting signals to the receiving end via the wireless links and the wired links from the signal source end;

Transmitting the detecting signals to the signal source end after the receiving end receives the detecting signals;

Calculating required durations for the detecting signals to be transmitted and received via the wireless links and the wired links; and Calculating the transmission rates of the wireless links and the wired links according to the required durations and a size of the detecting signals.

In the system for transmitting the data in parallel via the one or more wireless links and the one or more wired links of the present invention, the data allocating module comprises:

A fault processing unit for re-allocating the transmission data corresponding to one of the wireless links and the wired links to another one of the wireless links and the wired links with a highest transmission rate when a fault occurs in the one of the wireless links and the wired links.

In the system for transmitting the data in parallel via the one or more wireless links and the one or more wired links of the present invention, the wireless link or links comprise one or more of a wireless link of fourth generation (4G) mobile communication technology, a wireless link of third generation (3G) mobile communication technology, a wireless link of wireless fidelity (Wi-Fi), and a Bluetooth wireless link.

The beneficial effect of the present invention is that the data is transmitted via the wireless links and the wired links in parallel at the same time, the transmission rate of the data is increased, and it is beneficial for high-speed transmission of data with a large data size. Accordingly, the data transmission abilities of the links can be sufficiently utilized, and the data transmission abilities of the links are applied to the greatest extent.

DETAILED DESCRIPTION OF THE INVENTION

The present invention provides a method and a system for transmitting data in parallel via one or more wireless links and one or more wired links. In order to clarify the objectives, the technical schemes, and the advantages of the present invention, the description will be made as to the embodiments of the present invention in conjunction with the accompanying drawings. It should be understood that specific embodiments described herein are merely intended to explain the present invention, but are not intended to limit the present invention.

Figure 1:
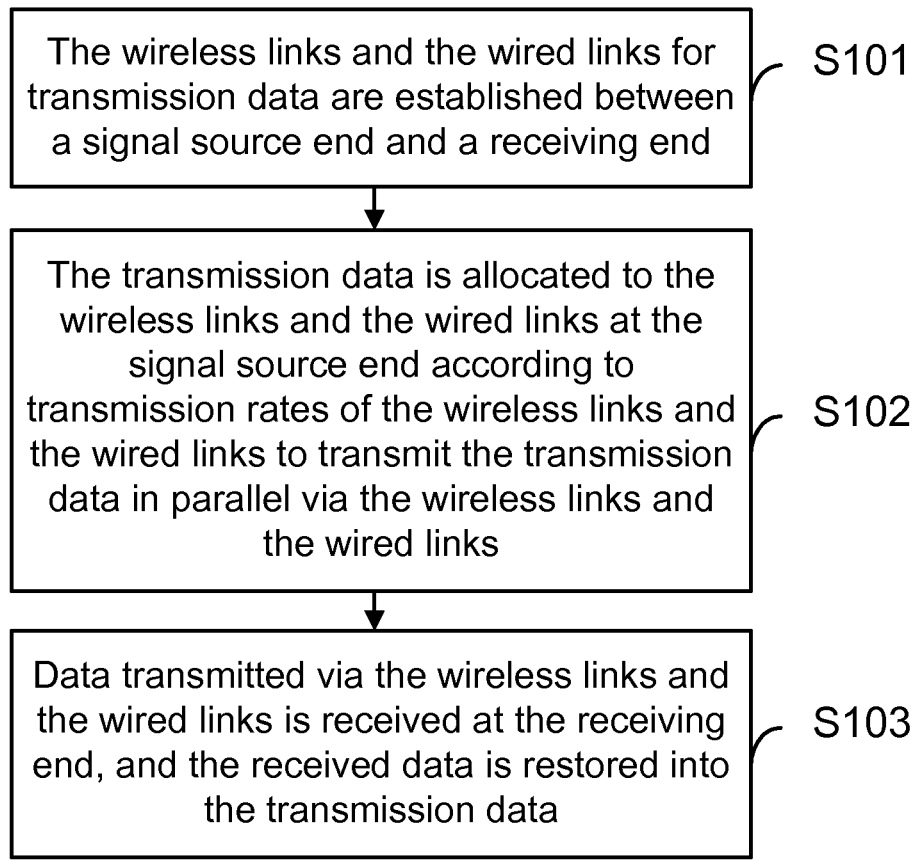
FIG. 1 is a flowchart of a method for transmitting data in parallel via one or more wireless links and one or more wired links in accordance with a preferred embodiment of the present invention.

Please refer to FIG. 1. FIG. 1 is a flowchart of a method for transmitting data in parallel via one or more wireless links and one or more wired links in accordance with the present invention. The method comprises the following steps.

In step S101, the wireless links and the wired links for transmission data are established between a signal source end and a receiving end.

In step S102, the transmission data is allocated to the wireless links and the wired links at the signal source end according to transmission rates of the wireless links and the wired links to transmit the transmission data in parallel via the wireless links and the wired links.

In step S103, data transmitted via the wireless links and the wired links is received at the receiving end, and the received data is restored into the transmission data.

In step S101, the wireless links and the wired links for the transmission data are established between the signal source end and the receiving end firstly. The wireless link or links may comprise one or more of a wireless link of fourth generation (4G) or third generation (3G) mobile communication technology, a wireless link of wireless fidelity (Wi-Fi), or a Bluetooth wireless link. Certainly, the wireless link or links may comprise other types of wireless links. The wired link or links may be a wired broadband link or wired broadband links. A conventional data transmission method utilizes a link to transmit data, such that the remaining links cannot be sufficiently utilized and the transmission rate of the transmission data cannot be increased. The present invention transmits the transmission data via the wireless links and the wired links at the same time for implementing the high-speed data transmission.

Figure 2:
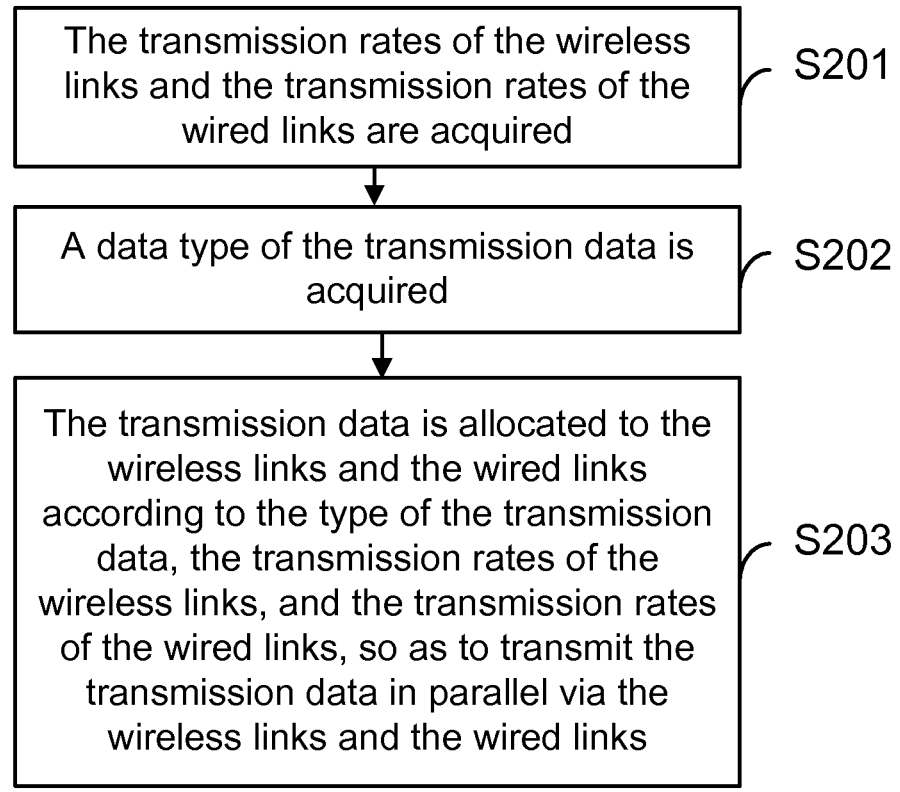
FIG. 2 is a specific flowchart of step S101 of the method in FIG. 1.

In step S102, the transmission data is required to be allocated, such that each of the wireless links and the wired links can transmit the transmission data. As shown in FIG. 2, step S102 may specifically comprise the following steps.

In step S201, the transmission rates of the wireless links and the transmission rates of the wired links are acquired.

Firstly, the transmission rates of the wireless links and the transmission rates of the wired links are calculated, so as to acquire which one of the links has a high transmission rate and which one of the links has a low transmission rate. A method for calculating the transmission rates with indicative numbers may be acquired by the following steps.

The signal source end transmits detecting signals with an identical size to the receiving end via each of the links.

The receiving end transmits the detecting signals to the signal source end after receiving the detecting signals.

Required durations for the detecting signals to be transmitted and received via the links are calculated.

The transmission rates of the links are calculated according to the required durations and the size of the detecting signals.

In step S202, a data type of the transmission data is acquired.

In the present step, the data type of the transmission data is acquired. The data type comprises a single-task data and a multi-task data. Splitting methods for various types of transmission data are different and will be specifically described in detail as follows.

In step S203, the transmission data is allocated to the wireless links and the wired links according to the type of the transmission data, the transmission rates of the wireless links, and the transmission rates of the wired links, so as to transmit the transmission data in parallel via the wireless links and the wired links.

In the present step, the transmission data is allocated to the wireless links and the wired links for transmitting the transmission data in parallel at the same time according to the data type of the transmission data and the transmission rates of the links.

When the transmission data required to be transmitted is a multi-task data, the data size of each task of the transmission data is acquired firstly.

The task with a large data size is allocated to one of the links with a high transmission rate, while the task with a low data size is allocated to one of the links with a low transmission rate.

Figure 3:
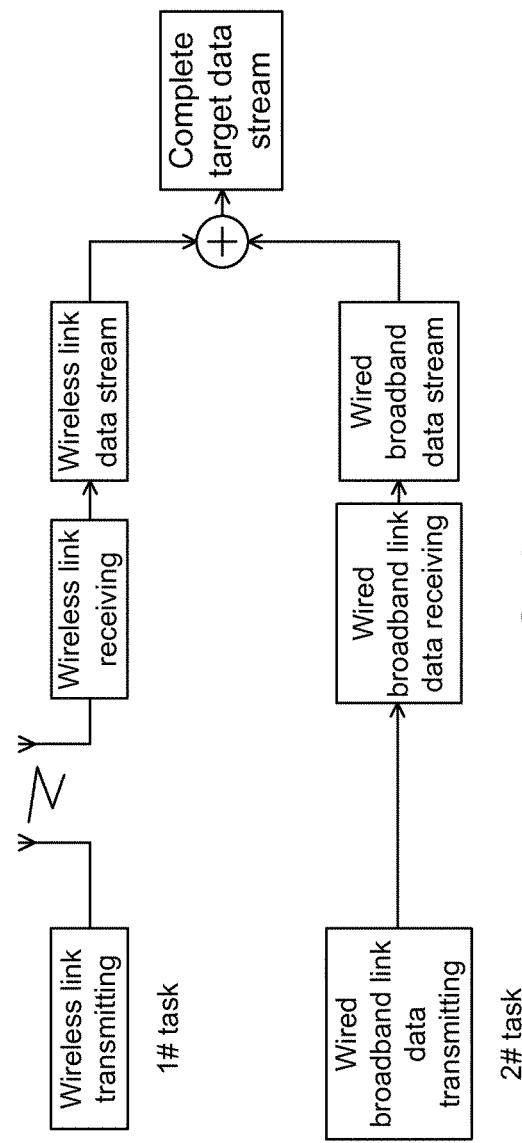
FIG. 3 is a flowchart of transmitting a multi-task data via links in accordance with the present invention.

For example, as shown in FIG. 3, there is only one wireless link, and there is only one wired link. The transmission data required to be transmitted is a two-task data. 1# task with a large data size is allocated to the wireless link with a high transmission rate, while 2# task with a low data size is allocated to the wired link with a low transmission rate. The wireless link and the wired link transmit the data in parallel. The receiving end normalizes each of the received tasks to generate a complete target data stream, that is, the data transmission data, and then corresponding displaying and storing processes are performed.

Certainly, the above-mentioned situation is only illustrated. In practice, there might be a plurality of wireless links, or the number of the tasks is different from the number of the links. A task with a larger data size may be split, and a data size of allocated data of each of the links is proportional to the transmission rate of the said link.

When the transmission data is a single-task data, the transmission data is split into a plurality of transmission data blocks according to the number of the wireless link or links, the number of the wired link or links, the transmission rates of the wireless link or links, and the transmission rates of the wired link or links. The transmission data blocks are allocated to the corresponding links. The number of the transmission data blocks is equal to the number of the links, and a size of each of the transmission data blocks corresponds to the transmission rate of the corresponding link.

Figure 4:
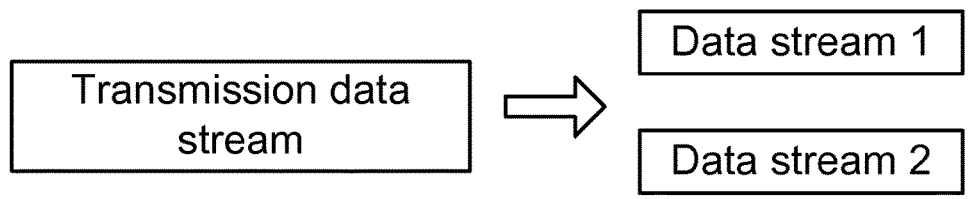
FIG. 4 is a flowchart of splitting data at a signal source end when data transmission is implemented in the method of the present invention.
Figure 5:
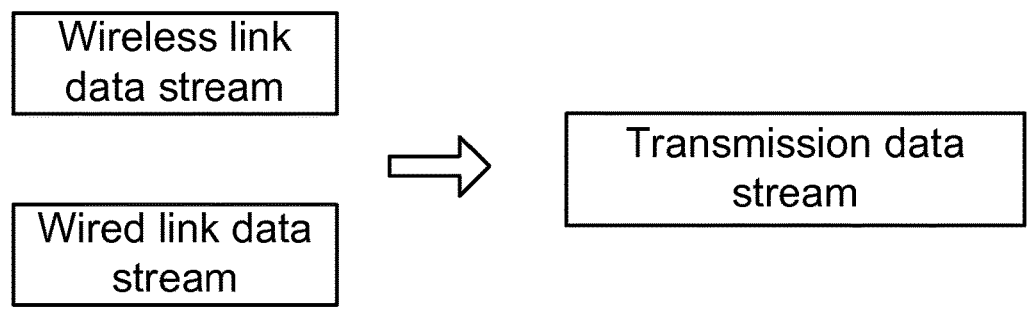
FIG. 5 is a flowchart of restoring data at a receiving end when data transmission is implemented in the method of the present invention.

For example, as shown in FIG. 4 and FIG. 5, a transmission data stream at a signal source end is split into a data stream 1 and a data stream 2 which are respectively allocated to the wireless link and the wired link and then transmitted via the wireless link and the wired link. The data stream 1 and the data stream 2 are connected at the receiving end, so as to be restored into the transmission data stream.

When the single-task data is transmitted, the number of the transmission data blocks is equal to the number of the links and the size of each of the transmission data blocks corresponds to the transmission rate of the corresponding link. Assume that there are two links including a wireless link and a wired link. The transmission rate of the wireless link is R1, while the transmission rate of the wired link is R2. Then, the single-task data is split into two transmission data blocks. A first transmission data block is transmitted via the wireless link, and the size thereof is R1/(R1+R2). A second transmission data block is transmitted via the wired link, and the size thereof is R2/(R1+R2). When the number of the wireless links and the wired links is another value, the transmission data can be split according to the above-mentioned principle as well, such that the number of the transmission data blocks is equal to that of the links, and the size of each of the split transmission data blocks is proportional to the transmission rate of each of the links. As a result, one of the links with a high transmission rate transmits one of the transmission data blocks with a large data size, while one of the links with a low transmission rate transmits one of the transmission data blocks with a small data size. The transmission data blocks are properly allocated.

Furthermore, when the single-task transmission is implemented and the transmission data is split, it is necessary to set identifiers for the transmission data blocks. The transmission data is sequentially split according to the identifiers. When the receiving end receives each of the transmission data blocks, the transmission data blocks are sequentially connected according to the identifiers and restored into the transmission data.

Furthermore, in step S102, when a fault occurs in one of the links, the transmission data transmitted by the one of the links is processed. Specifically, when a fault occurs in one of the links, the data transmitted by the one of the links is re-allocated to another one of links with a highest transmission rate and then transmitted.

For example, in the transmission links in FIG. 3, the data transmission rate of the wireless link is high, and the data transmission rate of the wired link is low. When a fault or a congestion occurs in the wired link, the data transmitted via the wired link is transmitted via the wireless link. This is the situation that there are two links. When there are three or more links, the data transmitted via the wired link is transmitted via one of the remaining links with the highest transmission rate.

In the present invention, each of the signal source end for transmitting the data and the receiving end for receiving the data may be one user's mobile terminal or one of other types of data terminals and can meet the requirement for transmitting the data with a high transmission rate.

Furthermore, the data which is allocated to each of the links at the signal source end may be encrypted during the transmission of the data. The receiving end decrypts the data which is received from each of the links according to a consistent protocol, and then the data is restored into the transmission data, thereby increasing the security of the data transmission.

Figure 6:
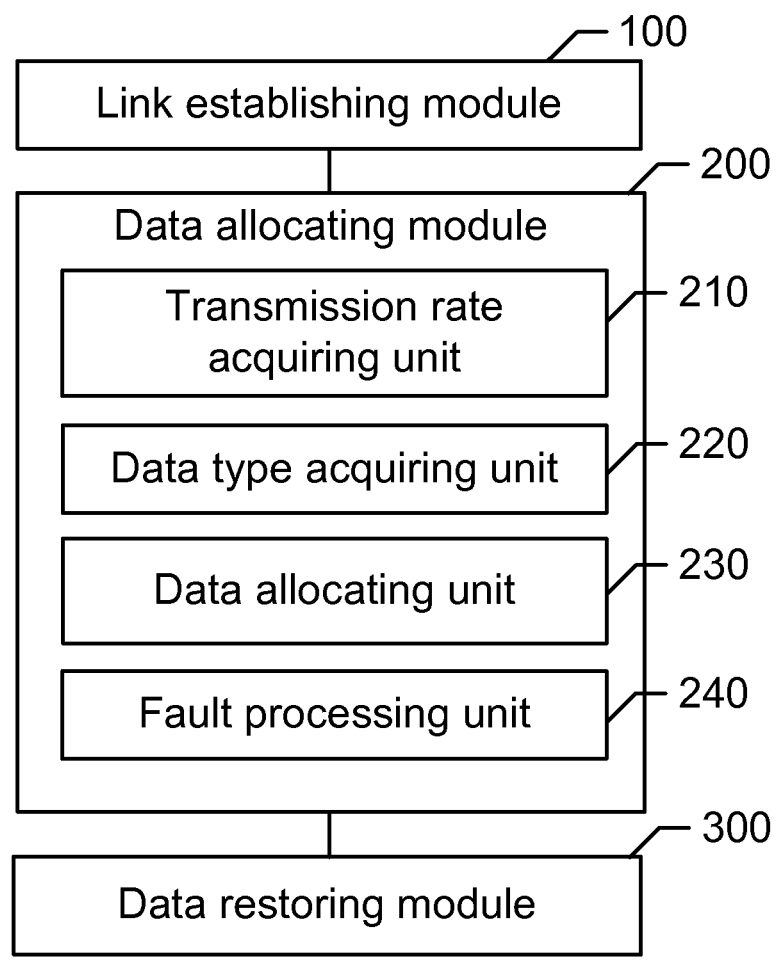
FIG. 6 is a block diagram of a system for transmitting data in parallel via one or more wireless links and one or more wired links in accordance with a preferred embodiment of the present invention.

Based on the above-mentioned method, the present invention further provides a system for transmitting data in parallel via one or more wireless links and one or more wired links in accordance with a preferred embodiment. As shown in FIG. 6, the system comprises:

A link establishing module 100 for establishing the wireless links and the wired links for transmission data between a signal source end and a receiving end;

A data allocating module 200 for allocating the transmission data to the wireless links and the wired links at the signal source end according to transmission rates of the wireless links and the wired links to transmit the transmission data in parallel via the wireless links and the wired links; and A data restoring module 300 for restoring received data into the transmission data after the receiving end receives the received data from the wireless links and the wired links.

Specifically, the data allocating module 200 comprises:

A transmission rate acquiring unit 210 for acquiring the transmission rates of the wireless links and the transmission rates of the wired links;

A data type acquiring unit 220 for acquiring a data type of the transmission data; and A data allocating unit 230 for allocating the transmission data to the wireless links and the wired links according to the type of the transmission data, the transmission rates of the wireless links, and the transmission rates of the wired links, so as to transmit the transmission data in parallel via the wireless links and the wired links.

Furthermore, when the transmission data is a multi-task data, the data allocating unit 230 acquires a data size of each task of the transmission data, allocates one of the tasks with a large data size to one of the wireless links and the wired links with a high transmission rate, and allocates one of the tasks with a low data size to one of the wireless links and the wired links with a low transmission rate.

Furthermore, when the transmission data is a single-task data, the data allocating unit 230 splits the transmission data into a plurality of transmission data blocks according to the number of the wireless link or links, the number of the wired link or links, the transmission rates of the wireless link or links, and the transmission rates of the wired link or links, and the transmission data blocks are allocated to the wireless link or links and the wired link or links. The number of the transmission data blocks is equal to the sum of the number of the wireless link or links and the number of the wired link or links. The sizes of the transmission data blocks correspond to the transmission rates of the wireless link or links and the wired link or links.

Furthermore, the transmission rate acquiring unit 210 acquires the transmission rates of the wireless links and the transmission rates of the wired links with the following steps:

Transmitting identical detecting signals to the receiving end via the wireless links and the wired links from the signal source end;

Transmitting the detecting signals to the signal source end after the receiving end receives the detecting signals;

Calculating required durations for the detecting signals to be transmitted and received via the wireless links and the wired links; and Calculating the transmission rates of the wireless links and the wired links according to the required durations and the size of the detecting signals.

Furthermore, the data allocating module 200 comprises:

A fault processing unit 240 for re-allocating the transmission data corresponding to one of the links to another one of the links with a highest transmission rate and then transmitting when a fault occurs in the one of the links.

In summary, the present invention utilizes the wireless link or links and the wired link or links to transmit the data in parallel at the same time, the transmission rate of the data is increased, and it is beneficial for high-speed transmission of data with a large data size. Accordingly, the data transmission abilities of the links can be sufficiently utilized, and the data transmission abilities of the links are applied to the greatest extent.

As is understood by a person skilled in the art, the foregoing preferred embodiments of the present invention are illustrative rather than limiting of the present invention. It is intended that various modifications and similar arrangements are to be included within the spirit and scope of the appended claims, the scope of which should be accorded the broadest interpretation so as to encompass all such modifications and similar structures.

What is claimed is:

1. A method for transmitting data in parallel via one or more wireless links and one or more wired links, comprising:

establishing the wireless links and the wired links for transmission data between a signal source end and a receiving end;

acquiring transmission rates of the wireless links and transmission rates of the wired links;

acquiring a data type of the transmission data;

allocating the transmission data to the wireless links and the wired links according to the data type of the transmission data, the transmission rates of the wireless links, and the transmission rates of the wired links to transmit the transmission data in parallel via the wireless links and the wired links; and receiving data transmitted via the wireless links and the wired links at the receiving end, and restoring the received data into the transmission data, wherein when a fault occurs in one of the wireless links and the wired links, the transmission data corresponding to the one of the wireless links and the wired links is re-allocated to another one of the wireless links and the wired links with a highest transmission rate, wherein the step of allocating the transmission data to the wireless links and the wired links to transmit the transmission data in parallel via the wireless links and the wired links comprises:

acquiring a data size of each task of the transmission data when the transmission data is a multi-task data; and allocating one of the tasks with a large data size to one of the wireless links and the wired links with a high transmission rate, and allocating one of the tasks with a low data size to one of the wireless links and the wired links with a low transmission rate, wherein the one of the tasks with the lame data size and the one of the tasks with the low data size are transmitted synchronously.

2. The method for transmitting the data in parallel via the one or more wireless links and the one or more wired links of claim 1, wherein the step of allocating the transmission data to the wireless links and the wired links to transmit the transmission data in parallel via the wireless links and the wired links comprises:

splitting the transmission data into a plurality of transmission data blocks according to a number of the wireless link or links, a number of the wired link or links, the transmission rates of the wireless link or links, and the transmission rates of the wired link or links when the transmission data is a single-task data; and allocating the transmission data blocks to the wireless link or links and the wired link or links, wherein a number of the transmission data blocks is equal to a sum of the number of the wireless link or links and the number of the wired link or links, and sizes of the transmission data blocks correspond to the transmission rates of the wireless link or links and the wired link or links.

3. The method for transmitting the data in parallel via the one or more wireless links and the one or more wired links of claim 1, wherein the step of acquiring the transmission rates of the wireless links and the transmission rates of the wired links comprises:
transmitting identical detecting signals to the receiving end via the wireless links and the wired links from the signal source end;
transmitting the detecting signals to the signal source end after the receiving end receives the detecting signals;
calculating required durations for the detecting signals to be transmitted and received via the wireless links and the wired links; and
calculating the transmission rates of the wireless links and the wired links according to the required durations and a size of the detecting signals.

4. The method for transmitting the data in parallel via the one or more wireless links and the one or more wired links of claim 1, wherein the wireless link or links comprise one or more of a wireless link of fourth generation (4G) mobile communication technology, a wireless link of third generation (3G) mobile communication technology, a wireless link of wireless fidelity (Wi-Fi), and a Bluetooth wireless link.

5. A method for transmitting data in parallel via one or more wireless links and one or more wired links, comprising:
establishing the wireless links and the wired links for transmission data between a signal source end and a receiving end;
allocating the transmission data to the wireless links and the wired links at the signal source end according to transmission rates of the wireless links and transmission rates of the wired links to transmit the transmission data in parallel via the wireless links and the wired links, wherein data which is allocated to each of the wireless links and the wired links is encrypted at the signal source end; and
receiving data transmitted via the wireless links and the wired links at the receiving end, and restoring the received data into the transmission data,
wherein the step of allocating the transmission data to the wireless links and the wired links at the signal source end according to the transmission rates of the wireless links and the transmission rates of the wired links to transmit the transmission data in parallel via the wireless links and the wired links comprises:
acquiring the transmission rates of the wireless links and the transmission rates of the wired links;
acquiring a data type of the transmission data; and
allocating the transmission data to the wireless links and the wired links according to the type of the transmission data, the transmission rates of the wireless links, and the transmission rates of the wired links to transmit the transmission data in parallel via the wireless links and the wired links,
wherein the step of allocating the transmission data to the wireless link and the wired link to transmit the transmission data in parallel via the wireless links and the wired links comprises:
acquiring a data size of each task of the transmission data when the transmission data is a multi-task data; and
allocating one of the tasks with a large data size to one of the wireless links and the wired links with a high transmission rate, and allocating one of the tasks with a low data size to one of the wireless links and the wired links with a low transmission rate,
wherein the one of the tasks with the large data size and the one of the tasks with the low data size are transmitted synchronously.

6. The method for transmitting the data in parallel via the one or more wireless links and the one or more wired links of claim 5, wherein the step of allocating the transmission data to the wireless links and the wired links to transmit the transmission data in parallel via the wireless links and the wired links comprises:
splitting the transmission data into a plurality of transmission data blocks according to a number of the wireless link or links, a number of the wired link or links, the transmission rates of the wireless link or links, and the transmission rates of the wired link or links when the transmission data is a single-task data; and
allocating the transmission data blocks to the wireless link or links and the wired link or links, wherein a number of the transmission data blocks is equal to a sum of the number of the wireless link or links and the number of the wired link or links, and sizes of the transmission data blocks correspond to the transmission rates of the wireless link or links and the wired link or links.

7. The method for transmitting the data in parallel via the one or more wireless links and the one or more wired links of claim 5, wherein the step of acquiring the transmission rates of the wireless links and the transmission rates of the wired links comprises:
transmitting identical detecting signals to the receiving end via the wireless links and the wired links from the signal source end;
transmitting the detecting signals to the signal source end after the receiving end receives the detecting signals;
calculating required durations for the detecting signals to be transmitted and received via the wireless links and the wired links; and
calculating the transmission rates of the wireless links and the wired links according to the required durations and a size of the detecting signals.

8. The method for transmitting the data in parallel via the one or more wireless links and the one or more wired links of claim 5, wherein the step of allocating the transmission data to the wireless links and the wired links at the signal source end according to the transmission rates of the wireless links and the transmission rates of the wired links to transmit the transmission data in parallel via the wireless links and the wired links comprises:
re-allocating the transmission data corresponding to one of the wireless links and the wired links to another one of the wireless links and the wired links with a highest transmission rate when a fault occurs in the one of the wireless links and the wired links.

9. The method for transmitting the data in parallel via the one or more wireless links and the one or more wired links of claim 5, wherein the wireless link or links comprise one or more of a wireless link of fourth generation (4G) mobile communication technology, a wireless link of third generation (3G) mobile communication technology, a wireless link of wireless fidelity (Wi-Fi), and a Bluetooth wireless link.

10. A system for transmitting data in parallel via one or more wireless links and one or more wired links, comprising:
one or more processors; and a memory connected with the one or more processors, the memory comprising a plurality of program instructions executable by the one or more processors, the program instructions comprising:

instructions that cause the one or more processors to establish the wireless links and the wired links for transmission data between a signal source end and a receiving end;

instructions that cause the one or more processors to allocate the transmission data to the wireless links and the wired links at the signal source end according to transmission rates of the wireless links and transmission rates of the wired links to transmit the transmission data in parallel via the wireless links and the wired links; and instructions that cause the one or more processors to restore received data into the transmission data after the receiving end receives the received data transmitted via the wireless links and the wired links, wherein the program instructions further comprise:

instructions that cause the one or more processors to acquire the transmission rates of the wireless links and the transmission rates of the wired links;

instructions that cause the one or more processors to acquire a data type of the transmission data; and instructions that cause the one or more processors to allocate the transmission data to the wireless links and the wired links according to the type of the transmission data, the transmission rates of the wireless links, and the transmission rates of the wired links to transmit the transmission data in parallel via the wireless links and the wired links, wherein when the transmission data is a multi-task data, the program instructions further comprise instructions that cause the one or more processors to acquire a data size of each task of the transmission data, allocate one of the tasks with a large data size to one of the wireless links and the wired links with a high transmission rate, and allocate one of the tasks with a low data size to one of the wireless links and the wired links with a low transmission rate, wherein the one of the tasks with the large data size and the one of the tasks with the low data size are transmitted synchronously.

11. The system for transmitting the data in parallel via the one or more wireless links and the one or more wired links of claim 10, wherein when the transmission data is a single-task data, the program instructions further comprise instructions that cause the one or more processors to split the transmission data into a plurality of transmission data blocks data according to a number of the wireless link or links, a number of the wired link or links, the transmission rates of the wireless link or links, the transmission rates of the wired link or links, and the transmission data blocks are allocated to the wireless link or links and the wired link or links, a number of the transmission data blocks is equal to a sum of the number of the wireless link or links and the number of the wired link or links, and sizes of the transmission data blocks correspond to the transmission rates of the wireless link or links and the wired link or links.

12. The system for transmitting the data in parallel via the one or more wireless links and the one or more wired links of claim 10, wherein the program instructions further comprise instructions that cause the one or more processors to acquire the transmission rates of the wireless links and the transmission rates of the wired links by transmitting identical detecting signals to the receiving end via the wireless links and the wired links from the signal source end, transmitting the detecting signals to the signal source end after the receiving end receives the detecting signals, calculating required durations for the detecting signals to be transmitted and received via the wireless links and the wired links, and calculating the transmission rates of the wireless links and the wired links according to the required durations and a size of the detecting signals.

13. The system for transmitting the data in parallel via the one or more wireless links and the one or more wired links of claim 10, wherein the program instructions further comprise:

instructions that cause the one or more processors to re-allocate the transmission data corresponding to one of the wireless links and the wired links to another one of the wireless links and the wired links with a highest transmission rate when a fault occurs in the one of the wireless links and the wired links.

14. The system for transmitting the data in parallel via the one or more wireless links and the one or more wired links of claim 10, wherein the wireless link or links comprise one or more of a wireless link of fourth generation (4G) mobile communication technology, a wireless link of third generation (3G) mobile communication technology, a wireless link of wireless fidelity (Wi-Fi), and a Bluetooth wireless link.

\* \* \* \* \*